United States Patent
Wild

(10) Patent No.: US 7,941,280 B2
(45) Date of Patent: May 10, 2011

(54) PROCEDURE AND DEVICE FOR CHECKING THE FUNCTIONALITY OF A TANK VENTILATION VALVE

(75) Inventor: Ernst Wild, Oberriexingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/333,009

(22) Filed: Dec. 11, 2008

(65) Prior Publication Data

US 2009/0240443 A1 Sep. 24, 2009

(30) Foreign Application Priority Data

Mar. 19, 2008 (DE) .......................... 10 2008 000 759

(51) Int. Cl.
*G01F 1/00* (2006.01)
*G01B 3/44* (2006.01)
(52) U.S. Cl. ............................ 702/34; 73/118.1; 702/45
(58) Field of Classification Search .................... 702/45, 702/50, 51, 100, 114, 34; 73/114, 39, 41, 73/114.43; 123/520, 568.15
See application file for complete search history.

(56) References Cited

U.S. PATENT DOCUMENTS

2005/0034513 A1 * 2/2005 Streib et al. .................. 73/118.1

FOREIGN PATENT DOCUMENTS

| DE | 103 35 902 | 2/2005 |
| JP | 2-136558 | 5/1990 |
| JP | 11-343925 | 12/1999 |

* cited by examiner

*Primary Examiner* — John H Le
(74) *Attorney, Agent, or Firm* — Merchant & Gould P.C.

(57) ABSTRACT

A procedure for checking the functionality of a tank ventilation valve of a tank ventilation system for a motor vehicle with a fuel tank, an adsorbing filter, which is connected to the fuel tank over a filter line and which provides a vent pipe, and with the tank ventilation valve, which is connected to the inlet manifold of a combustion engine that provides an actuator for the idle mode over valve pipes, is thereby characterized, in that the mass flow that flows through the tank ventilation valve in the idle mode of the combustion engine and the mass flow that flows through the actuator for the idle mode are detected and in that the functionality of the tank ventilation valve is deduced from a variation of the actuator for the idle mode.

12 Claims, 3 Drawing Sheets

PROCEDURE AND DEVICE FOR CHECKING THE FUNCTIONALITY OF A TANK VENTILATION VALVE

TECHNICAL FIELD

The invention concerns a procedure for checking the functionality of a tank ventilation valve of a tank ventilation system for a motor vehicle according to the category of the independent claim 1.

Subject of the invention are also a device, which is customized for implementing the procedure according to the invention, as well as a computer program and a computer program product with a program code, which is saved on a machine readable medium, for implementing the procedure.

BACKGROUND

Fuel vapors, which escape from a tank, must not be let into the environment. For that reason fuel vapors from the tank are let into an adsorbing vessel that preferably contains an activated carbon filter, the activated carbon holds the fuel vapors back, so that air can only escape into the environment over a ventilation pipe. In order to regenerate the activated carbon in the adsorbing vessel, a connecting line is provided between the adsorbing vessel and a inlet manifold of the combustion engine. For the regeneration a controllable tank ventilation valve is opened and the fuel mass that has been stored in the activated carbon is sucked into the inlet manifold and brought to the combustion by the combustion engine during the operation of the combustion engine. The functionality of the tank ventilation system is controlled. When a significant mixture deviation occurs at the opening of the tank ventilation valve, this can indicate that fuel vapor is sucked off the activated carbon and the activated carbon filter is flushed out.

When using not loaded activated carbon filters by contrast only air is sucked in that case an elaborated 'air-checking' is undertaken. For this purpose the tank ventilation valve is actively controlled in idle mode only for diagnostic reasons and the reactions of the air system are detected and 'observed'. But this diagnosis has to be rejected often, because the diagnosis result may possibly be useless by the cut-off or add-on consumer loads during this diagnosis.

A procedure for a tank ventilation in a combustion engine arises from DE 103 35 902 A1, in which a fuel mass flow through a tank ventilation valve or a characteristic curve is obtained, compared to a fuel mass flow that has been determined with the aid of the measuring data of a pressure sensor, and the fuel mass flow that is obtained from the characteristic curve is corrected depending on the fuel mass flow that has been determined with the aid of the pressure sensor data. This allows the registration of tolerances of the tank ventilation valve. By doing so it can be excluded, that the fuel amount that is de- or increased by the tolerance, which is brought to the combustion engine, is misinterpreted as a lower or higher loading. The problem of this procedure is that the detection of the fuel mass flow is carried out by a pressure sensor. Furthermore a diagnosis is only possible with an active controlling of the tank ventilation valve.

The invention is therefore based on the task to enable a diagnosis of the tank ventilation valve with its active controlling, which is furthermore insensitive towards consumer load add-ons and cut-offs.

SUMMARY

This task is solved by a procedure with the characteristics of claim 1. The basic idea of the invention is to analyze a correlation between the fuel mass flow that flows in idle mode of the combustion engine through the tank ventilation valve and the mass flow that flows through the actuator for the idle mode. The functionality of the tank ventilation valve can be deduced from a reaction of the air actuator.

The measures that are listed in the dependent claims allow advantageous improvements and corrections of the procedure that is stated in the independent claims.

According to a very advantageous improvement the correlation coefficient between the variations of the mass flow that flows through the tank ventilation valve and the variations of the mass flow that flows through the idle actuator is therefore determined and the functionality of the tank ventilation valve is deduced from this correlation coefficient. If for example the tank ventilation valve is jammed, no counter-reaction of the actuator for idle air, which is called air actuator in the following, can be established. A correlation does not take place and the correlation coefficient is virtually zero in that case. A big advantage of this procedure is that it is insensitive to consumer load cut-offs and add-ons due to the waiver of an active control of the tank ventilation valve. This allows a resource-saving and application-friendly implementation.

According to a preferred embodiment of the procedure the correlation coefficient is formed from the sum of the products of the deviations from the assigned averages of the mass flows that flow through the tank ventilation valve and the mass flows that flow through the idle actuator divided by the radical of the product of the sums of the squared deviations from the assigned averages of the mass flows that flow through the tank ventilation valve and the mass flows that flows through the idle actuator, whereby a functioning tank ventilation valve is deduced, when the correlation coefficient adopts the value −1, and whereby a jamming of the tank ventilation valve, which means a non-functioning tank ventilation valve, is deduced, when the correlation coefficient adopts the value 0. 'Assigned' averages always means the average of the mass flow over the tank ventilation valve in the case of the mass flow over the tank ventilation valve, and the average of the mass flow over the actuator for the idle air in the case of the mass flow over the actuator for the idle air.

In a first embodiment of the procedure moving averages are formed, which are determined with the aid of low-pass filters. In another embodiment arithmetic averages are formed over a default number of measuring points, which are preferably established with the aid of integrators.

The measuring points are determined in a default time pattern.

Also the correlation coefficients are preferably determined in a default time pattern.

The time pattern for adsorbing the measuring points or for determining the correlation coefficients amounts for example to 100 ms. That means that measuring points are detected and/or correlation coefficients are determined at an interval of 100 ms.

This task is furthermore solved by a device for checking the functionality of a tank ventilation valve, which provides at least one customized control unit for implementing the procedure, which contains measures for implementing the procedure. This device can for example be a circuit arrangement. In that case the steps of the procedure are implemented by circuit sections, for example by low-pass filters, integration circuits and similar.

But the device can also be realized by a computer. In that case the procedure runs as a computer program on the computer. The program can be saved on a computer program product, which allows a communication with the computer, for example a selecting. Because additional hardware, for example additional sensors or similar, is not required for the implementation of the procedure, the procedure can be upgraded in existing control units.

BRIEF DESCRIPTION OF THE DRAWINGS

Execution examples and embodiments of the invention are illustrated in the drawings and further explained in the following description.

It is schematically shown in.

DETAILED DESCRIPTION

Figure 1:
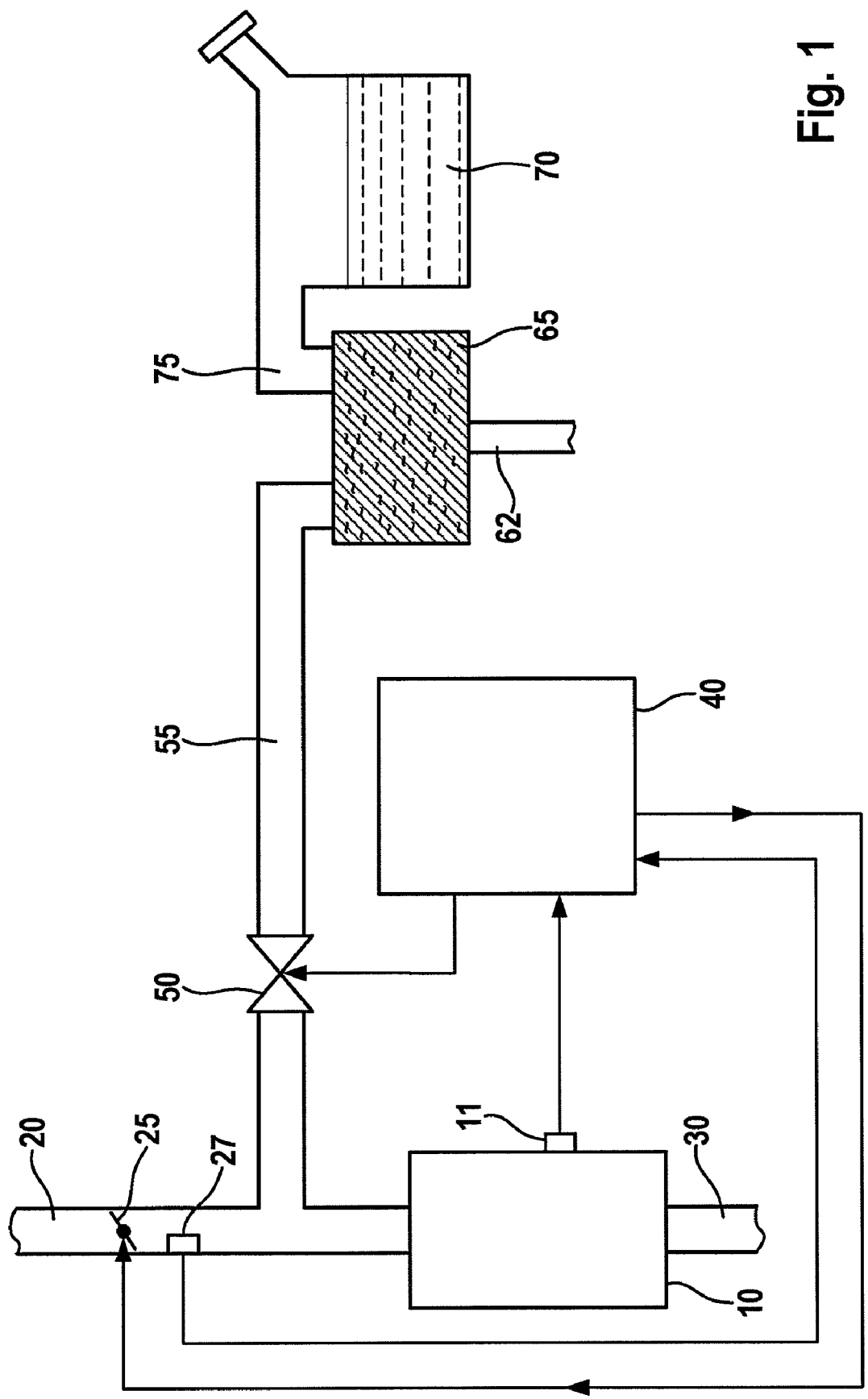
FIG. 1 is a tank ventilation system of a motor vehicle, which uses the procedure according to the invention.

FIG. 1 schematically illustrates an embodiment of a tank ventilation system of motor vehicle. A combustion engine 10 is supplied with air over an inlet manifold 20. The inlet manifold 20 contains a controllable actuator 25, this actuator 25 is for example controlled by an engine control unit 40. The exhaust gases of the combustion engine 10 flow into an exhaust gas pipe 30. The operating behavior of the combustion engine 10 determined by a number of sensors, for example engine speed sensors, load detecting sensors, temperature sensors and similar. Vicariously for these sensors in FIG. 1 a sensor 11 is shown, whose output signals are supplied to the engine control unit 40. Depending on theses signals the actuator 25 is controlled, in order to vary the air supply this way. Furthermore a fuel metering device 27, which supplies the combustion engine 10 with fuel from a tank 70 of, flows into the inlet manifold 20. By doing so the combustion engine is supplied with a desired air/fuel ratio.

The tank 70 is connected to an activated carbon filter 65 over a pipe 75. The activated carbon filter 65 provides a vent pipe 62, which can be closed by a controllable valve 60.

The activated carbon filter 65 is connected to the inlet manifold 20 of the combustion engine 10 over a pipe 55. A tank ventilation valve 50, which is also controllable by the engine control unit 40, is arranged in the pipe 55.

Fuel that evaporates in the tank 70 is saved in the activated carbon filter 65. When the activated carbon filter 65 has exceeded its load limit at the latest, the tank ventilation valve 50 is controlled by the control unit 40 in order to open during the operation of the combustion engine. Simultaneously the stop valve 60 is controlled in order to open. By doing so fuel vapors that have been adsorbed at the activated carbon are supplied to the inlet manifold 20 over the pipe 55 and combusted in the combustion engine 10. Due to the pressure proportions the activated carbon filter is simultaneously flushed out with fresh air.

The tank ventilation valve 50 has to undergo a diagnosis for its functionality being an exhaust gas relevant component now. For this purpose the invention provides to detect the mass flow that flows through or over the tank ventilation valve 50 and the mass flow that flows through or over the actuator 25 during an idle mode of the combustion engine, and to deduce the functionality of the tank ventilation valve 50 from a variation of the actuator 25, which functions during an idle operation as an actuator for idle air. For this purpose the invention provides, to determine the correlation coefficient between the variations of the mass flow that flows through the tank ventilation valve 50 and the variation of the mass flow that flows through the actuator 25 for idle air, and to deduce the functionality of the tank ventilation valve 50 from the correlation coefficient. In other words it is provided to correlate in idle mode the varying mass flow over the tank ventilation valve 50 with the flow variations of the actuator for idle air, for example of an electronic gas pedal or an idle actuator at a mechanic throttle, which for example is arranged in a bypass to the inlet manifold 20. The correlation is thereby adjusted by an idle regulator, which has to close the air actuator 25 at a constant air demand, when the air flow over the tank ventilation valve 50 increases. This closing process takes place at a functioning tank ventilation valve 50. But for example at a jammed tank ventilation valve 50 no 'counter reaction' of the air actuator 25 can be observed. In that case the correlation coefficient would be virtually or even 0.

The advantage of the procedure is the waiver of an active control of the actuator 25. By doing so the procedure is insensitive to consumer load cut-offs and add-ons. It is also a resource-saving and application-friendly realization.

The correlation coefficient rkor is the sum of the products of the deviations of both factors x and y that have to be correlated from the assigned averages $\bar{x}$, $\bar{y}$ divided by the radical of the product of the sums of the deviations of the factors that have to be correlated from the averages squared:

$$rkor = \frac{\sum (xi-\bar{x}) \cdot (yi-\bar{y})}{\sqrt{\sum (xi-\bar{x})^2 \cdot \sum (yi-\bar{y})^2}}$$

Thereby x means the mass flow over the tank ventilation valve 50 and y the mass flow over the actuator 25 for the idle air, thus in this case over the controllable actuator 25. When the tank ventilation valve 50 is functioning this results in a correlation coefficient rkor=−1. When the tank ventilation valve 50 is jammed this results in a value rkor=0, whereby jammed means here jammed in each position. The previously described correlation coefficient can be determined in two ways.

Figure 2:
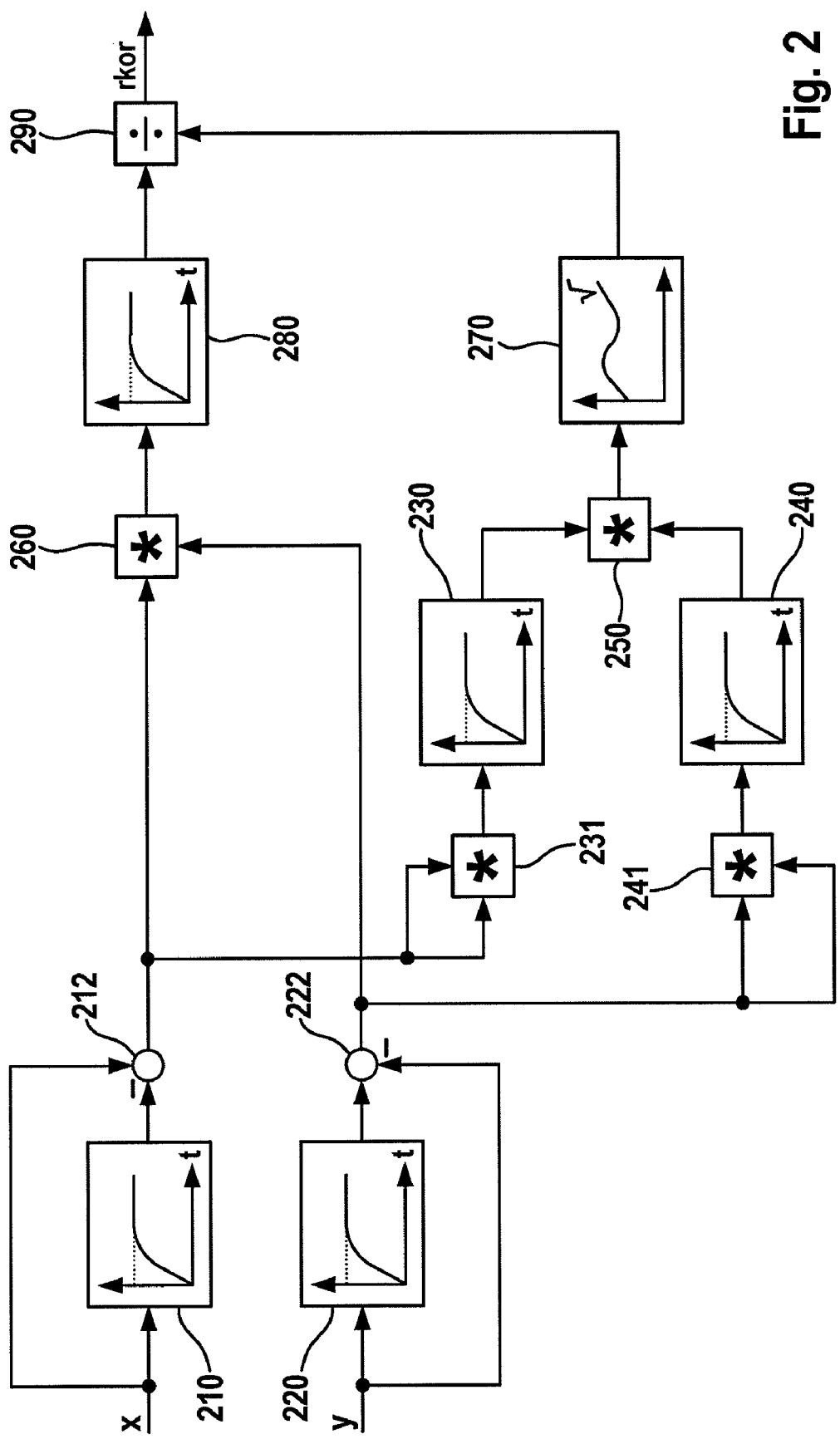
FIG. 2 is an embodiment of the procedure in the form of a block diagram.

A first embodiment of the procedure uses a moving average for this purpose, which is realized by low-pass filters. Such a procedure is schematically illustrated in FIG. 2 in the form of a block diagram. The factors x and y are supplied to low-pass filters 210 and 220. These low-pass filters realize the totaling of the deviations of the current measured values xi from the average $\bar{x}$ or yi from the average $\bar{y}$. These averages are thereby each in subtraction steps 212, 222 subtracted from the current measured values xi, yi. Then the product is formed in step 260, whereby the low-pass filter again realizes the totaling over this product. Simultaneous with this the squares of the deviations from the averages $(xi-\bar{x})^2$ are formed in step 231 and $(yi-\bar{y})^2$ in step 241. These squares are totaled, whereby again a low-pass filter 230 is used for the totaling of the squares of the deviations of the factors xi from the averages x and a low-pass filter 240 for the totaling of the squares of the deviations yi from the averages $\bar{y}$. The sums that have been established by doing so are then multiplied in step 250 and then the radical is taken from this product in step 270. The result that has been established this way is divided in step 290 from the sum of the products of the deviations from the assigned averages of both factors x and y, which have to be correlated and which have been previously determined. The result is the correlation coefficient rkor.

The previously mentioned procedure uses a moving average, which is realized by the low-pass filters 210, 220, 230, 240 and 280.

The averages of the measured values are thereby divided by the sum of the measured values established by the number of measured values. The diagnosis shall take place at all times with new measured values in the control unit 40. Therefore it is an advantage to use moving averages, which are realized by low-pass filters.

It is not shown in FIG. 2 that the calculation of the correlation coefficient rkor takes place in a 100 ms pattern, not shown is furthermore that the calculation only takes place during idle operation. Therefore another control signal has to be provided, which indicates the idle mode.

Figure 3:
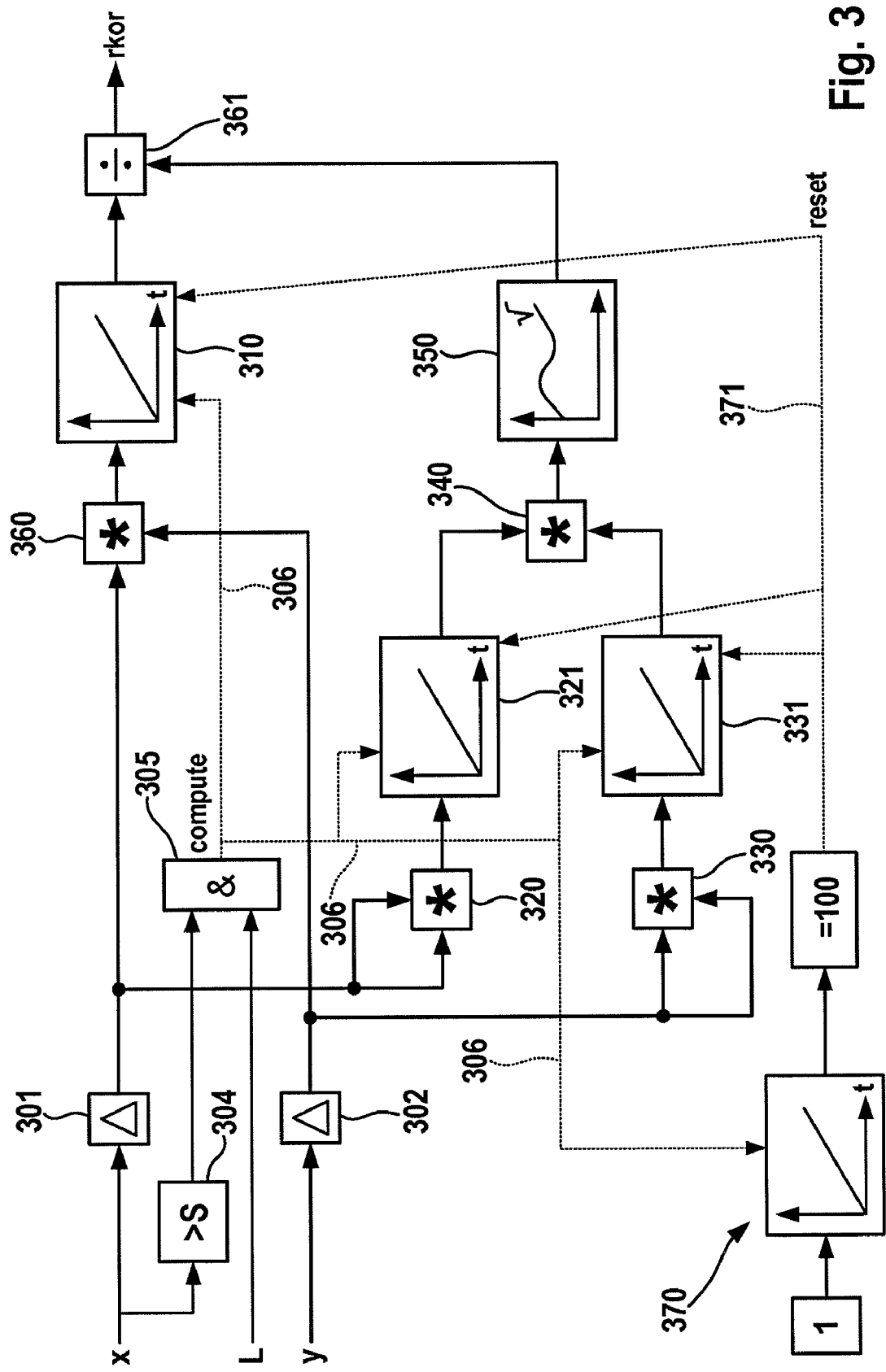
FIG. 3 is another embodiment of the procedure in the form of a block diagram.

An alternative embodiment, shown by the block diagram in FIG. 3, uses arithmetic averages, which are realized by integrators. The measuring value detection in FIG. 3 also takes place in the 100 ms pattern, whereby the condition L=1 indicates an idle mode. A further simplification is shown in the block diagram. Instead of forming the averages xi–$\bar{x}$ and yi–$\bar{y}$, FIG. 3 shows only the differences between the old (timely adrift in the pattern) and the new (current) value (xi–xi–1; yi–yi–1). These differences are only formed when the difference xi–xi–1 is greater than a default threshold S, which is determined in step 304. The previously mentioned differences are formed in steps 301 and 302. These differences are multiplied in step 306 and supplied to an integrator 310. This upper part of the block diagram shown in FIG. 3 corresponds with the totaling of the products of the deviations from the averages or the deviations of the measured values being consecutive in the time pattern and therefore with the realization of the numerator of the above stated equation.

Simultaneous with this the squares of the deviations are formed insteps 320, 330 and also summed up, which again happens by integrators 321, 331. The sums that have been formed by doing so are multiplied in step 340 and then the radical of this product is formed in step 350. This result is then subtracted from the sum of the products of the deviations from the averages, whereby this again results in the correlation coefficient rkor. A numerator 370, also illustrated by an integrator, counts the number of the evaluated differences and orders the calculation of the correlation coefficient rkor, when it reaches the number of 100. In that case the integrators 310, 321, 331 and 370 are set back by a reset-signal, which is indicated by dotted lines 371. After resetting a new integration takes place initiated by the element 305 or by the circuit section 305, what is indicated by the dotted lines 306.

The functionality of the tank fuel ventilation valve 560 can be checked by the previously described procedure, without even having to actively control it. The previously described procedure reacts furthermore very insensitive to consumer load cut-offs and add-ons, so that the realization of the functionality checking of the tank fuel ventilation valve 50 is considered to be resource-saving and application-friendly.

The procedure can run in a control unit 40 that has been customized for the implementation of the procedure and which contains devices for implementing the procedure. The procedure can also be implemented as a computer program on a control unit 40 of a combustion engine and run there. The program code can be saved on a machine readable medium, which the control unit 40 can read. By doing so the procedure can be upgraded even at existing tank ventilation systems. This only because no additional hardware, as for example additional sensors and similar, are required.

The invention claimed is:

1. A method for checking functionality of a tank ventilation valve of a tank ventilation system of a motor vehicle, wherein an adsorbing filter including a vent pipe is connected to a fuel tank over a first filter line and connected to the tank ventilation valve over a second filter line, and wherein the tank ventilation valve is further connected to an inlet manifold of a combustion engine that provides an actuator for an idle mode over a valve pipe, the method comprising:
  measuring a mass flow that flows through the tank ventilation valve in an idle mode of the combustion engine;
  measuring a mass flow that flows through the actuator in the idle mode;
  calculating a correlation coefficient between a variation of the mass flow that flows through the tank ventilation valve and a variation of the mass flow that flows through the actuator for the idle mode; and
  determining an operational status of the tank ventilation valve from the calculated correlation coefficient.

2. A method according to claim 1, further comprising forming calculating the correlation coefficient by forming a ratio comprising:
  a first term comprising a sum of a plurality of products of deviations of an assigned average of the mass flows that flow through the tank ventilation valve and the mass flows that flow through the an actuator; and
  a second term comprising a radical of a plurality of products of a sum of a squared deviation of an assigned average of the mass flows that flow through the tank ventilation valve and the mass flows that flows through the idle actuator;
  wherein a functioning tank ventilation valve is determined when the correlation coefficient is evaluated as less than zero, and a jamming of the tank ventilation valve is determined when the correlation coefficient is evaluated as equal to zero.

3. A method according claim 2, further comprising forming a moving average.

4. A method according to claim 3, further comprising forming the moving average with at least one low-pass filter.

5. A method according to claim 2, further comprising forming an arithmetic average over a default number of measuring points.

6. A method according to claim 5, further comprising forming the arithmetic average with at least one integrator.

7. A method according to claim 5, further comprising detecting the measuring points in a default time pattern.

8. A method according to claim 7, further comprising detecting the measuring points in a 100 millisecond time pattern.

9. A method according to claim 1, further comprising determining the correlation coefficient in a default time pattern.

10. A device configured for checking functionality of a tank ventilation valve of a tank ventilation system for a motor vehicle with a fuel tank, an adsorbing filter, that is connected to the fuel tank over a filter line and that provides a vent pipe, and with the tank ventilation valve, that is connected to the inlet manifold of a combustion engine that provides an actuator for the idle mode over a valve pipe, the device configured to: measure a mass flow that flows through the tank ventilation valve in an idle mode of the combustion engine; measure a mass flow that flows through the actuator in the idle mode; calculate a correlation coefficient between a variation of the mass flow that flows through the tank ventilation valve and a variation of the mass flow that flows through the actuator for the idle mode; and determine an operational status of the tank ventilation valve from the calculated correlation coefficient.

11. A computer-implemented method for checking functionality of a tank ventilation valve of a tank ventilation system for a motor vehicle with a fuel tank, an adsorbing filter, that is connected to the fuel tank over a filter line and that provides a vent pipe, and with the tank ventilation valve, that is connected to the inlet manifold of a combustion engine that provides an actuator for the idle mode over a valve pipe, the method including steps implemented by a computer or control unit comprising: measuring a mass flow that flows through the tank ventilation valve in an idle mode of the combustion engine; measuring a mass flow that flows through the actuator in the idle mode; calculating a correlation coefficient between a variation of the mass flow that flows through the tank ventilation valve and a variation of the mass flow that flows through the actuator for the idle mode; and determining an operational status of the tank ventilation valve from the calculated correlation coefficient.

12. A computer program product with a program code stored on a machine readable medium to implement, when the computer program product is executed on a computer or a control unit, steps of a method for checking functionality of a tank ventilation valve of a tank ventilation system for a motor vehicle with a fuel tank, an adsorbing filter, that is connected to the fuel tank over a filter line and that provides a vent pipe, and with the tank ventilation valve, that is connected to the inlet manifold of a combustion engine that provides an actuator for the idle mode over a valve pipe, the steps comprising: measuring a mass flow that flows through the tank ventilation valve in an idle mode of the combustion engine; measuring a mass flow that flows through the actuator in the idle mode; calculating a correlation coefficient between a variation of the mass flow that flows through the tank ventilation valve and a variation of the mass flow that flows through the actuator for the idle mode; and determining an operational status of the tank ventilation valve from the calculated correlation coefficient.

* * * * *

UNITED STATES PATENT AND TRADEMARK OFFICE
CERTIFICATE OF CORRECTION

| | | |
|---|---|---|
| PATENT NO. | : 7,941,280 B2 | Page 1 of 1 |
| APPLICATION NO. | : 12/333009 | |
| DATED | : May 10, 2011 | |
| INVENTOR(S) | : Wild | |

It is certified that error appears in the above-identified patent and that said Letters Patent is hereby corrected as shown below:

Col. 3, line 31: "Depending on theses" should read --Depending on these--

Col. 6, line 19, claim 2: "through the an actuator; and" should read --through the actuator; and--

Col. 6, line 23, claim 2: "flows that flows through" should read --flows that flow through--

Signed and Sealed this
Twenty-ninth Day of November, 2011

David J. Kappos
*Director of the United States Patent and Trademark Office*